US006603623B1

(12) United States Patent
Fontana, Jr. et al.

(10) Patent No.: US 6,603,623 B1
(45) Date of Patent: Aug. 5, 2003

(54) INDUCTIVE MAGNETIC RECORDING HEAD WITH IMPEDANCE MATCHING ELEMENTS

(75) Inventors: Robert E. Fontana, Jr., San Jose, CA (US); Prakash Kasiraj, San Jose, CA (US); Klaassen Berend Klaassen, San Jose, CA (US); Mason Lamar Williams, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/556,983

(22) Filed: Apr. 24, 2000

(51) Int. Cl.[7] .................................................. G11B 5/02
(52) U.S. Cl. .......................................... 360/68; 360/126
(58) Field of Search ............................ 360/681, 46, 67, 360/123, 126

(56) References Cited

U.S. PATENT DOCUMENTS

| 5,121,273 A | 6/1992 | Slezak | |
|---|---|---|---|
| 5,440,434 A | 8/1995 | Kanegae | |
| 5,491,597 A | 2/1996 | Bennin et al. | |
| 5,608,591 A | 3/1997 | Klaassen | |
| 5,777,829 A | * 7/1998 | Voldman et al. | ............. 360/128 |
| 5,978,181 A | * 11/1999 | Niijima et al. | ............... 360/323 |
| 6,331,919 B1 | * 12/2001 | Klaassen et al. | ............... 360/46 |

* cited by examiner

*Primary Examiner*—David Hudspeth
*Assistant Examiner*—Varsha A. Kapadia
(74) *Attorney, Agent, or Firm*—Khanh Q. Tran, Esq.; Joseph P. Curtin, Esq.

(57) ABSTRACT

A method for forming a termination for a magnetic write head in which a magnetic write coil having an inner turn and an outer turn is formed on a wafer. A bottom capacitor plate for a capacitor on the wafer. A resistor having a first terminal and a second terminal is also formed on the wafer. A dielectric layer is formed over the bottom capacitor plate for the capacitor. A top capacitor plate is formed on the dielectric layer. An overpass lead is formed between the inner turn of the coil and one of the bottom capacitor plate and the top capacitor plate. The first terminal of resistor is connected to the capacitor plate that is not connected to the inner turn of the write coil. The second terminal of the resistor is connected to the outer turn of the write coil. An impedance formed by the write coil, the capacitor and the resistor substantially equals a characteristic impedance $Z_0$ of an interconnect circuit that will be connected to the write coil.

15 Claims, 7 Drawing Sheets

INDUCTIVE MAGNETIC RECORDING HEAD WITH IMPEDANCE MATCHING ELEMENTS

CROSS-REFERENCE TO RELATED APPLICATION

The present application is related to U.S. patent application Ser. No. 09/369,320, now U.S. Pat. No. 6,331,919 B1, entitled "Write Head Termination In Magnetic Recording," invented by K. B. Klaassen et al., filed Aug. 6, 1999, and incorporated by reference herein.

BACKGROUND OF THE INVENTION

1. Field of the Invention

The present invention relates to write driver circuits for magnetic recording. More particularly, the present invention relates to write driver circuits for high data rate magnetic recording and techniques for fabricating such write driver circuits.

2. Description of the Related Art

FIG. 1 shows a high RPM disk drive 10 having a magnetic read/write head (or a recording slider) that is positioned over a selected track on a magnetic disk 11 for recording data using a servo system. The stage servo system includes a voice-coil motor (VCM) 13 for coarse positioning a read/write head suspension 12 and may include a microactuator, or micropositioner, for fine positioning the read/write head over the selected track. FIG. 2 shows an enlarged exploded view of the read/write head end of suspension 12 in the case when a microactuator is also being used. An electrostatic rotary microactuator 14 is attached to a gimbal structure 15 on suspension 12, and a slider 16 is attached to the microactuator. A read/write head 17 is fabricated as part of slider 16.

For high data rate magnetic recording, the write path of a recording channel front-end requires a wide bandwidth and short waveform rise and fall times in order to accurately transfer high-frequency write data patterns to a magnetic medium, such as a disk. The write signal includes abrupt switching, that is, polarity reversals of the signal, that represent the information that is to-be-recorded. The abrupt switching generates high-frequency harmonics that must be transferred from the write driver to the magnetic write transducer (write head) in order that the write signal is accurately transferred onto the magnetic medium.

Conventional write drivers have a high output impedance, essentially forming a current source for the write current needed to drive an inductive write head. The output impedance is much greater than the head input impedance. FIG. 3 shows a conventional write driver circuit 30 that is connected directly to the (bonding) terminals of a magnetic write transducer (write head) 32 through a suspension interconnect 31. Write driver circuit 30 is configured as a current commutating write-driver circuit and includes two switches S and two switches $\overline{S}$ that are connected in an H configuration. An obstacle in transferring the write data output signal from write driver circuit 30 to write head 32 is in the propagation of the write signal along interconnect 31 between write driver circuit 30 and the write head 32.

The invention described below improves the propagation of the write signal along an interconnect between a write driver circuit and a write head, while maintaining the signal integrity, i.e., the signal properties essential for high data rate writing.

SUMMARY OF THE INVENTION

The present invention provides a technique for improving propagation of the write signal along an interconnect between a write driver circuit and a write head. The advantages of the present invention are provided by a method for forming a termination for a magnetic write head in which a magnetic write coil has an inner turn and an outer turn that are formed on a wafer. A bottom capacitor plate for a capacitor is formed on the wafer using a liftoff process or subtraction patterning using ion milling. A resistor having a first terminal and a second terminal is also formed on the wafer using a liftoff process or ion milling. A dielectric layer is formed over the bottom capacitor plate for the capacitor using, for example, a liftoff process. A top capacitor plate is formed on the dielectric layer using a liftoff process or ion milling. An overpass lead is formed between the inner turn of the coil and one of the bottom capacitor plate and the top capacitor plate. The first terminal of the resistor is connected to the capacitor plate that is not connected to the inner turn of the write coil. The second terminal of the resistor is connected to the outer turn of the write coil. An impedance formed by the write coil, the capacitor and the resistor substantially equals a characteristic impedance $Z_0$ of an interconnect circuit that will be connected to the write coil.

According to the invention, the capacitor and the resistor form a load termination network that is connected in parallel across the write coil. Further, the write coil has an inductance $L_h$ and a resistance $R_h$, and the load termination network includes a first resistance R, a second resistance $R_{ex}$ and a capacitance C. The characteristic impedance $Z_0$ of the interconnect circuit, the inductance $L_h$ and the resistance $R_h$ of the coil, and the first resistance R, the second resistance $R_{ex}$ and the capacitance C of the load terminated network are related by $$Z_0 = R = R_{ex} + R_h = \sqrt{L_h/C}.$$

The present invention also provides a magnetic head that includes a substrate, a write coil formed on the substrate, and a load termination network for the coil formed on the substrate. The load termination circuit includes at least one of a capacitor and a resistor. Preferably, the load termination network includes a capacitor and a resistor that form a load termination network that is connected in parallel across the write coil so that an impedance formed by the write coil, the capacitor and the resistor substantially equals a characteristic impedance $Z_0$ of an interconnect circuit that will be connected to the write coil.

According to another aspect of the present invention, a disk drive includes a write driver output stage, an interconnect circuit and a magnetic head. The write driver output stage has an output. The interconnect circuit has an input, an output and a characteristic impedance $Z_0$. The input of the interconnect circuit is coupled to the write signal output of the write driver output stage. The magnetic head has an input that is coupled to the output of the interconnect circuit. The magnetic head includes a substrate, a write coil formed on the substrate, and a load termination network for the coil formed on the substrate. The load termination circuit includes at least one of a capacitor and a resistor. Preferably, the load termination network includes a capacitor and a resistor that form a load termination network that is connected in parallel across the write coil so that an impedance formed by the write coil, the capacitor and the resistor substantially equals the characteristic impedance $Z_0$ of the interconnect circuit.

BRIEF DESCRIPTION OF THE DRAWING

The present invention is illustrated by way of example and is not limited by the accompanying figures in which like reference numerals indicate similar elements and in which.

DETAILED DESCRIPTION

Figure 1:
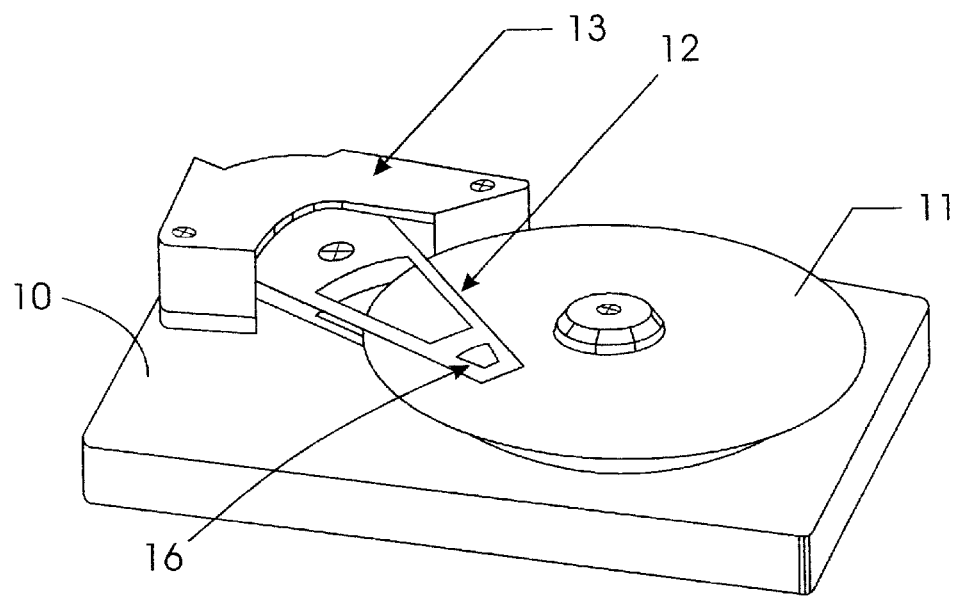
FIG. 1 shows a disk drive having a magnetic read/write head that is positioned over a selected track on a magnetic disk for recording data.
Figure 2:
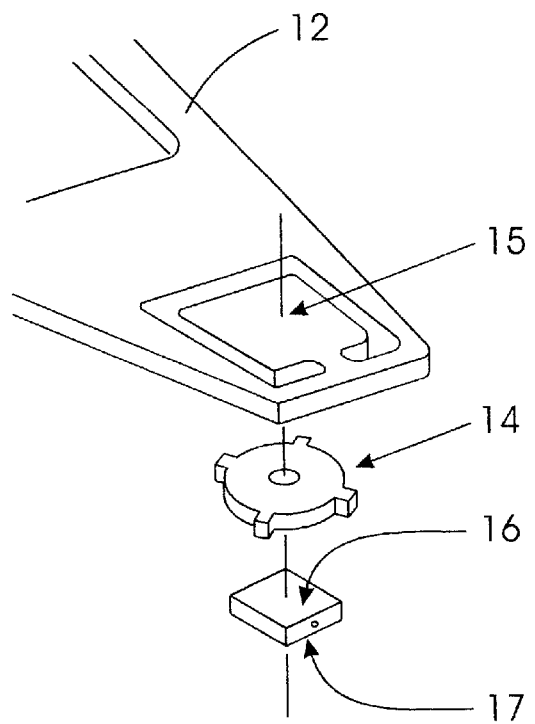
FIG. 2 sows an enlarged exploded view of the read/write head end of a head suspension, which may be used in the disk drive of FIG. 1.

The present invention provides a suspension interconnection having a selected characteristic impedance that is terminated on either the write driver side (source termination) or on the head side (load termination) with an impedance that is substantially equal to the selected characteristic impedance of the interconnect. The selected characteristic impedance of the suspension interconnect can be attained for the load-terminated case by using passive electrical components, such as resistors, capacitors, inductors and transformers, that can be formed at the backside of a slider using the same processing that is used for fabricating the read and the write heads on the backside of the slider. These passive electrical components can also be implemented (for instance, in surface mounting technology) at a location close to the write head, i.e., on top of the slider body or on the suspension. The selected characteristic impedance of the suspension interconnect can in the case of source termination be achieved by placing an electrical impedance in parallel across the output of a current-type write driver; or a series impedance in the output of a voltage-type write driver, or by applying feedback networks across the output stage of the write driver such that the output impedance of this stage becomes substantially equal to the selected characteristic impedance of the suspension interconnect. The above impedances can be implemented on the write driver chip, or off the chip close to the output terminals of the chip.

Thus, while a conventional electronic module containing the write driver (the read/write module) is located away from the write head, the present invention allows the electronic module to be located at the base plate of the disk drive enclosure, on the actuator arm that moves the read and write transducers (heads) to a desired data track on the disks, or on the suspension spring assembly attached to the actuator arm holding the read/write heads. Additionally, a termination circuit according to the present invention allows write head designs to be used that have appreciable inductance (30–75 nH) for high data rate applications (>75 MB/s).

The suspension interconnect can be designed to have a selected characteristic impedance $Z_0$ by, for example, designing the conductive traces to have a certain width (W) and height (h) over a conductive ground plane (the suspension spring), separated by a dielectric material having a certain thickness (t) and electrical permittivity ($\in_r$). See, for example, U.S. Pat. No. 5,608,591 to Klaassen, which is incorporated by reference herein. If the characteristic impedance of free space is denoted by $Z_{oa}$ ( 377Ω), the characteristic impedance $Z_0'$ of a "micro-strip line" is to first order approximation given by:

$$Z_0' = Z_{oa} \frac{t}{\sqrt{\varepsilon_r} \, W_{\mathit{eff}} \left[ 1.836 + 1.735\varepsilon_r - 0.0724\frac{W_{\mathit{eff}}}{t} \right]},$$

where the effective line width $W_{\mathit{eff}}$ is $$W_{\mathit{eff}} = W + \frac{h}{\pi}\left\{\ln\left[\frac{2t}{h}\right] + 1\right\}.$$

It is apparent from these equations that, by a proper choice of $\in_r$, t, W, and h, a particular value of characteristic impedance $Z_0'$ can be selected. The range for $Z_0'$ is determined by the range over which the interconnect parameters $\in_r$, t, W, and h can be varied. For a write interconnect, a balanced pair micro-strip lines is used and as a result the write interconnect characteristic impedance $Z_0=2Z_0'$. For the write interconnect, it is desirable to made $Z_0$ as high as permitted by the allowed values and the tolerances of the interconnect parameters. Such a "high impedance" write interconnect allows a relatively wider bandwidth and shorter rise and fall times for a given write head inductance and write driver electronics. For instance, with the following minimum values: $\in_{r\ min}=2.7$, $t_{max}=20$ μm, $W_{min}=10$ μm, $h_{min}10$ μm, the characteristic impedance $Z_0$ become 80.8Ω.

Figure 4:
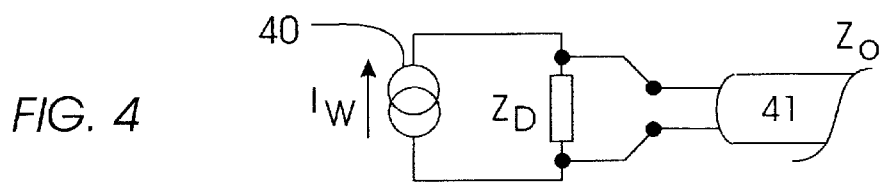
FIG. 4 shows a current-type write driver circuit that is source-terminated to the characteristic impedance $Z_0$ of a suspension interconnect according to the present invention.

The write driver in FIG. 4 shows a current-type write driver circuit 40 that is source-terminated to the characteristic impedance $Z_0$ of a suspension interconnect 41 according to the present invention by using an electrical impedance $Z_D$ circuited in parallel across the current-type write driver 40, whose magnitude is substantially equal to $Z_0$. Write driver 40 has an output impedance that is much greater than the characteristic impedance $Z_0$ of any interconnect. Impedance $Z_D$ can be placed on the electronics chip of the read/write module, or external to the electronics chip, but in close proximity to the output of the current-type write driver.

Figure 5:
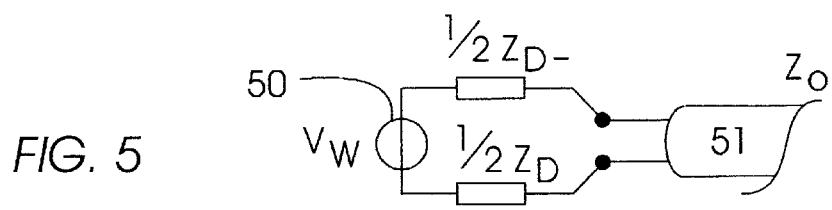
FIG. 5 shows a voltage-type write driver that is source-terminated to the characteristic impedance $Z_0$ of a suspension interconnect according to the present invention.

FIG. 5 shows a voltage-type write driver 50 that is source-terminated to the characteristic impedance $Z_0$ of a suspension interconnect 51 according to the present invention. Voltage-type write driver 50 has an output impedance that is much less than characteristic impedance $Z_0$ of any interconnect. The write driver circuit 50 is source terminated to suspension interconnect 51 by an electrical impedance $Z_D$ that is placed in series with the output of write driver circuit 50. Impedance $Z_D$ is selected to be substantially equal to $Z_0$. For a balanced drive, the source-terminated impedance can be distributed by placing ½ $Z_0$ in both output leads, as indicated in FIG. 5.

Figure 6:
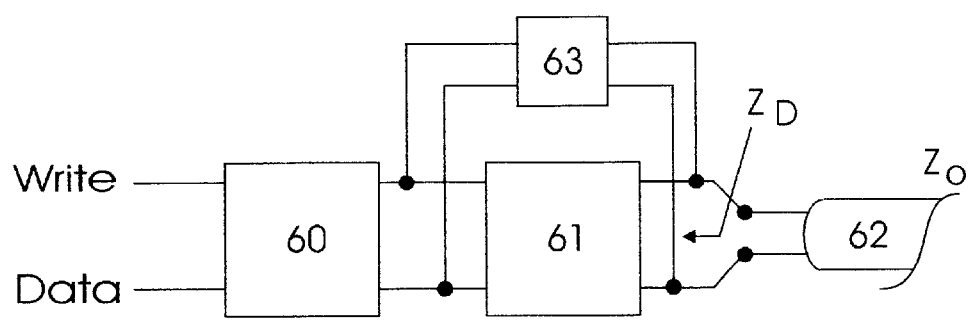
FIG. 6 shows a schematic block diagram of a write driver circuit using electronic feedback to create an output impedance $Z_0$ according to the present invention.

FIG. 6 shows a schematic block diagram of a source-terminated write driver circuit having an output impedance $Z_D$ that is substantially equal to $Z_0$ and that is obtained by applying electronic feedback to the output stage of a write driver, thereby decreasing the output impedance of a current driver to the impedance $Z_0$. Electronic feedback can also be used for increasing the output impedance of a voltage-type write driver to substantially equal $Z_0$. In FIG. 6, write data is input to a pre-driver circuit 60 before being applied to an output stage 61. The output of output stage 61 is connected to a suspension interconnect 62 having a characteristic impedance $Z_0$. A feedback circuit 63 is connected in parallel with output stage 61 to adjust the output impedance of the write driver circuit.

Figure 7:
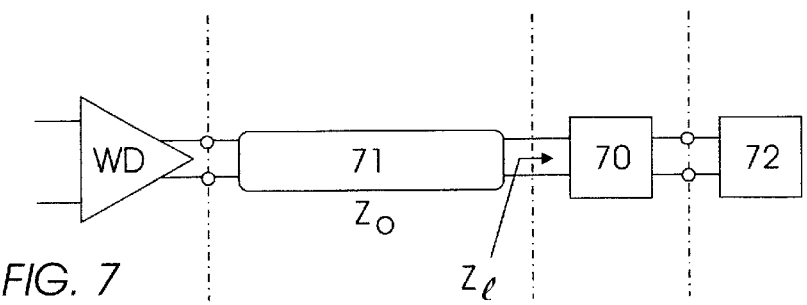
FIG. 7 shows a load-side termination network that is connected between the end of a suspension interconnect and a write head according to the present invention.

Load termination of the write head side of a suspension interconnect can be provided by placing a network of electrical impedances, such as resistors, capacitors, inductors and/or transformers, between the end of the suspension interconnect and the write head, such as shown in FIG. 7. FIG. 7 shows a network 70 that is connected between the end of a suspension interconnect 71 and a write head 72. The components of network 70 can be located on the slider body with the write head, and can be fabricated during the same fabrication processes required for making the read and write heads on the trailing side of the slider body. Network 70 can also be implemented with discrete elements in surface mount technology on top of the slider body. Alternatively, network 70 can be fabricated on the suspension at some convenient location along the suspension, but preferably close to the head.

Figure 8:
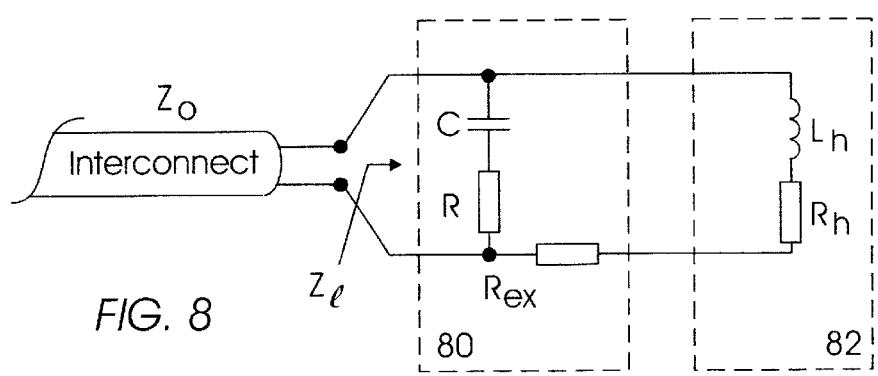
FIG. 8 shows a specific embodiment of a load-side termination network according to the present invention.

FIG. 8 shows a configuration of an electrical network 80 for a load-side termination according to the present invention. In FIG. 8, $L_h$ and $R_h$ are the inductance and resistance, respectively, of the coil of write head 82. Electrical components R, C and $R_{ex}$ are external to write head 82, and form the load terminating network 80. Design rules for obtaining load termination are:

$$Z_l = R = R_{ex} + R_h = \sqrt{L_h/C} = Z_0.$$

If this design rule is satisfied, the input impedance $Z_l$ of load termination network 80 is equal to $Z_0$. Of course, this is only the case as long as write head 82 is connected across the output of the network 80. As an example, consider the situation when $Z_0 = 100\Omega$. It follows that $R = 100\Omega$, $R_{ex} = 75\Omega$, $R_h = 25\Omega$, $L_h = 25$ nH, and $C = 2.5$ pF.

Figure 3:
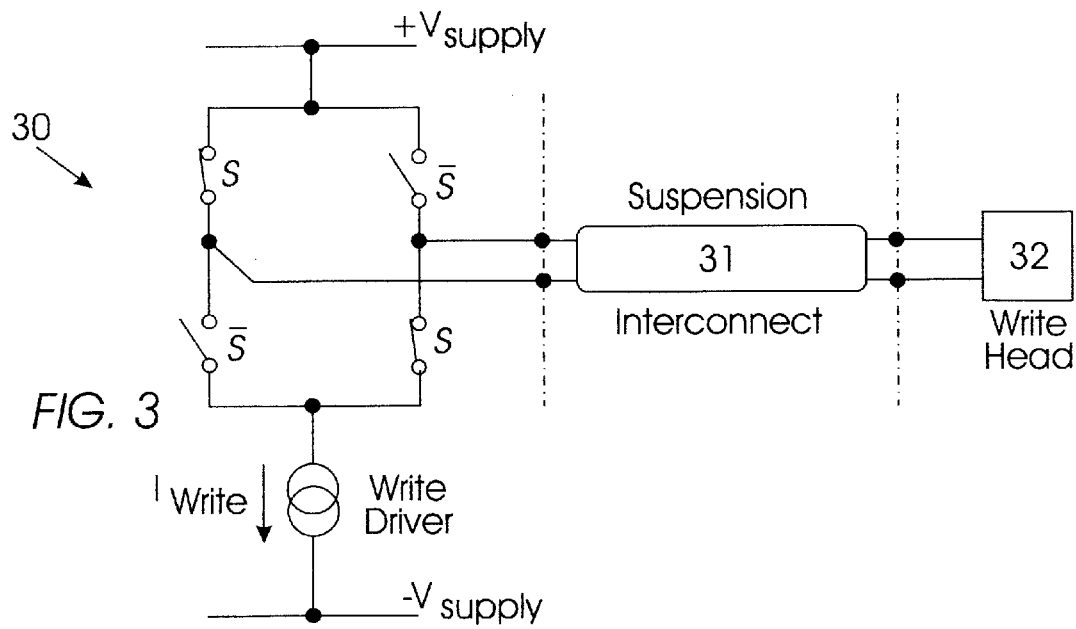
FIG. 3 shows a conventional electronic write driver circuit that is connected to a magnetic write head through a suspension interconnect.

Resistance $R_{ex}$ can be included in the head coil and leads by fabricating thinner and narrower conductors accordingly. The input impedance which the write driver circuit "sees" in the case of a load-terminated suspension is $Z_0$. Consequently, the write driver circuit is not required to accommodate the inductive voltage transients, such as those occurring in conventional write drivers (FIG. 3), at the moments of write current reversal. Thus, according to the present invention, a write driver circuit can be designed to have a lower power supply voltage $V_s$, which, for the same write current, will also give a lower power dissipation.

The current rise $\tau_r$ and fall times $\tau_f$ for the head inductance $\tau_h$ of FIG. 8 are for this specific type of load termination given by:

$$\tau_r = \tau_f = \frac{L_h}{R_h + R_{ex}} = \frac{L_h}{R} = \frac{L_h}{Z_0}.$$

The fastest switching is obtained by making the characteristic impedance $Z_0$ as large as possible and the head inductance $L_h$ as small as possible. If, in FIG. 8, there is a substantial parasitic capacitance $C_{par}$ across the write head, the optimum load terminating network is given by the following design rule:

$$Z_l = R = R_{ex} + R_h = \sqrt{\frac{L_h - C_{par}R_h^2}{C}} = Z_0.$$

Of course, the present invention is not restricted to the specific embodiment of a load-side termination network, such as shown in FIG. 8. Depending on the electrical impedance of the coil of the write head, any network of R, L and C (including a transformer), producing an input impedance $Z_l$ that is substantially equal to the suspension interconnect impedance $Z_0$ over the frequency range of interest, when inserted between the write head and the suspension interconnect is within the scope of the present invention.

Figure 9:
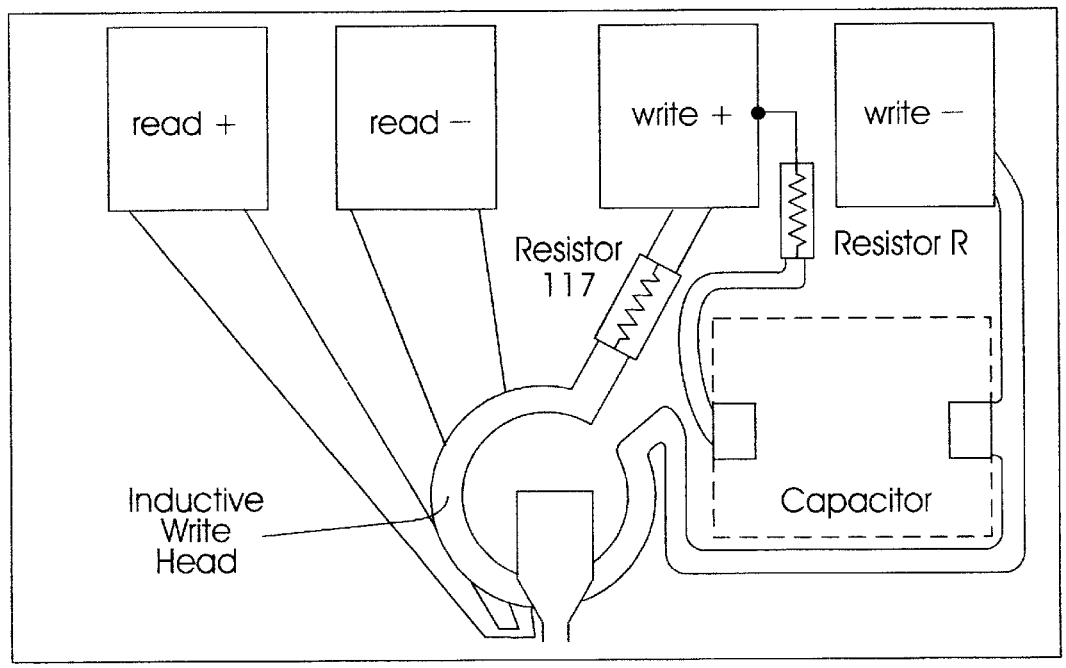
FIG. 9 shows a view of a read/write head having an added resistance and a parallel plate capacitor that are fabricated into the connecting leads of an inductive write head according to the present invention

FIG. 9 shows a read/write head having an added resistance and a parallel plate capacitor that are fabricated into the connecting leads of an inductive write head according to the present invention. The capacitor and resistance of a load-side termination network of the present invention can be fabricated into the connecting leads of an inductive write head during the wafer processing, thus adding only minimal cost to the head. Such a read/write head is plug-compatible with existing magnetic recording technology because no additional external wiring is required. The additional resistance can be fabricated away from the recording head so that the power is dissipated over a relatively much larger area and so that heating effects are minimized.

A load-side termination network according to the present invention can be fabricated into the head at the wafer level using existing materials that are currently used for fabricating recording heads. Table 1 shows electrical properties of some materials used in conventional recording heads.

TABLE 1

|  |  | Cu | Alumina | Ta | nichrome |
|---|---|---|---|---|---|
| electrical conductivity | Ohms*$\mu$m | 0.017 |  | 0.05 | 1 |
| dielectric constant |  |  | $8\epsilon_0$–$10\epsilon_0$ |  |  |

Using the materials shown in Table 1, 100$\Omega$ resistors and 2.5 pF parallel plate capacitors can be fabricated having dimensions shown in Table 2, where the size dimensions shown are in microns.

TABLE 2

| Material | Thickness | Length | Width | Ohms |
|---|---|---|---|---|
| | | Resistance | | |
| Cu | 0.1 | 1200 | 2 | 102 |
| Ta | 0.1 | 100 | 5 | 100 |
| nichrome | 0.1 | 50 | 5 | 100 |

| Material | Spacing | Length | Width | pF |
|---|---|---|---|---|
| | | Capacitance | | |
| Alumina | 0.1 | 100 | 100 | 2.66 |
| Alumina | 0.05 | 50 | 100 | 2.66 |

Parallel plate capacitors and series resistors can be fabricated into the recording head by embedding the capacitor plates and resistors into the underlayer to minimize the impact on conventional head processing approaches. Alternatively, the additional electrical elements can be fabricated on top of the head overcoat after completion of normal head processing for further minimizing changes to existing head processes and designs.

Figure 10:
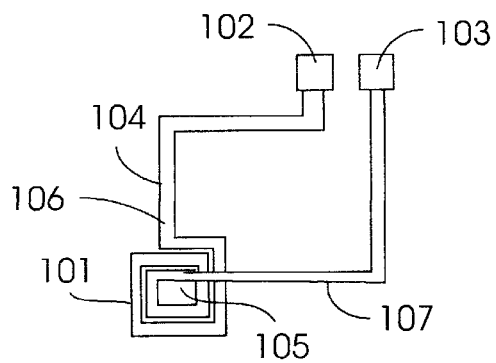
FIG. 10 shows a conventional technique for connecting a coil to the output pads of head slider.

FIG. 10 shows a conventional technique for connecting a coil 101 to the output pads 102 and 103 of head slider. During a conventional process sequence, coil 101 and coil lead 104 are formed during a single plating step. Insulation (not shown) is the applied over coil 101, followed by opening vias onto an inner coil turn 105 and the end of a coil lead 106. An overpass lead 107 is then plated connecting inner coil turn 105 to output pad 103, and coil lead 104 is connected to output pad 102.

Figure 11:
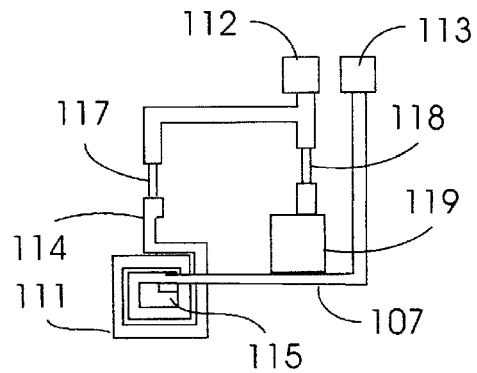
FIG. 11 shows a technique for connecting a coil to the output pads of head slider according to the present invention.

The present invention integrates resistors and capacitors in series or in parallel with a coil, as shown in FIG. 11. In FIG. 11, a coil 111 and a coil lead 114 are plated in a single plating step. Resistors 117, 118 and a bottom capacitor plate are then defined. (The bottom capacitor plate is not shown in FIG. 11 because of the particular view shown in FIG. 11.) A capacitor dielectric (also not shown) is then deposited on the bottom capacitor plate, followed by formation of a top capacitor plate 119. All the structures are then insulated, followed by adding via openings to resistors 117, 118, the capacitor plates, coil inner turn 115 and coil lead 114. An overpass lead 107 is then plated to make electrical connection to the electrical elements. Finally, the pad structure is formed to complete the coil configuration.

Figure 12:
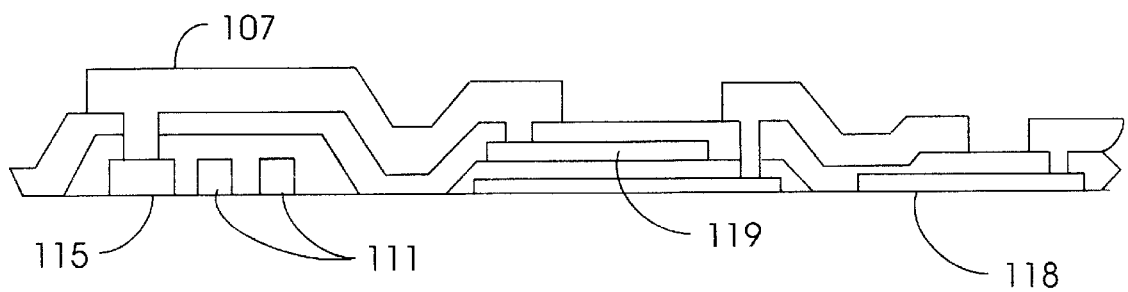
FIG. 12 shows a cross sectional view of connections between an inner coil turn, a capacitor and a resistor that are formed in parallel with the coil according to the present invention.
Figure 13:
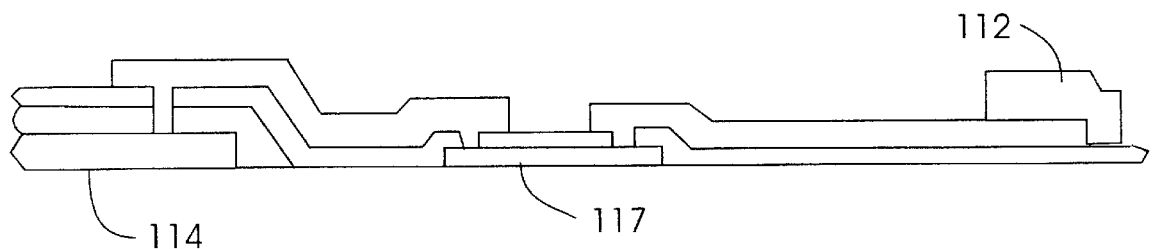
FIG. 13 shows a cross sectional view of connections between a coil lead and a resistor that are formed in series with the coil according to the present invention.

FIG. 12 shows a cross sectional view of connections between inner coil turn 115, the capacitor 119 and resistor 118 that are formed to be electrically in parallel with coil 111 and resistor 117. Capacitor 119, resistor 118, coil 111 and resistor 117 are not formed all at the same time. FIG. 13 shows a cross sectional view of connections between coil lead 114 and resistor 117 that are formed to be electrically in series with the coil. Resistor 117 is not formed at the same time.

Figure 14A:
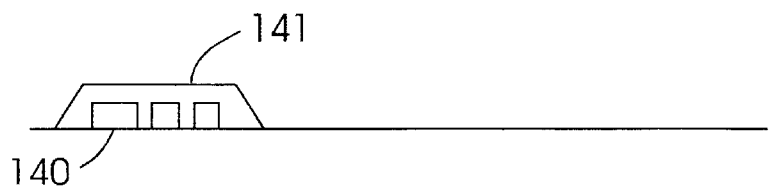
FIGS. 14a–14g show details of the process for forming resistors and capacitors in series or in parallel with a coil according to the present invention.
Figure 14B:
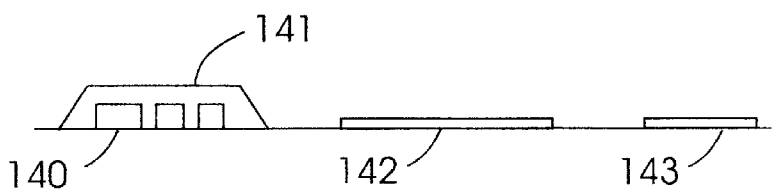
Figure 14C:
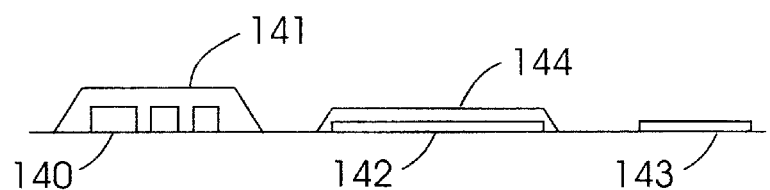
Figure 14D:
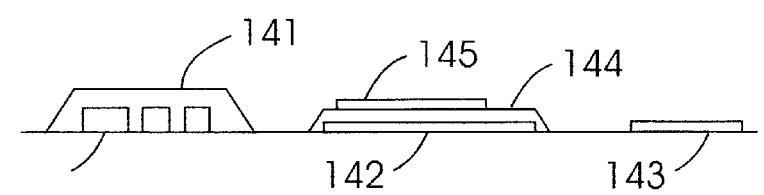
Figure 14E:
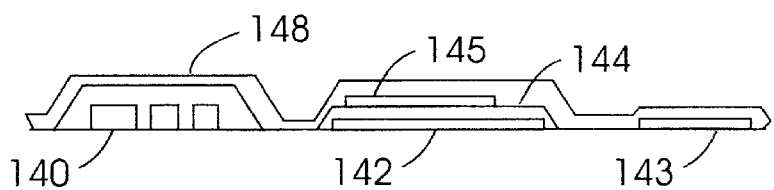
Figure 14F:
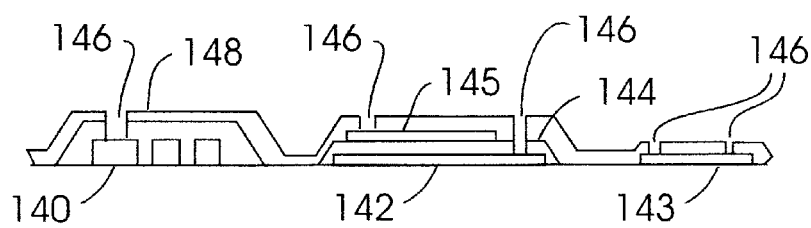
Figure 14G:
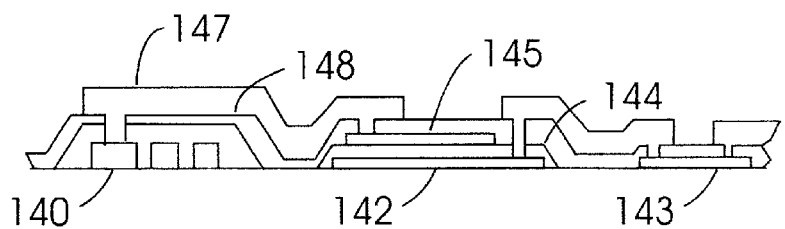

Details of the process for forming resistors and capacitors in series or in parallel with a coil according to the present invention are shown in FIGS. 14a–14g. After coil 140 and coil insulation 141 are formed on a wafer W (FIG. 14a), a bottom capacitor plate 142 and a resistor 143 are formed using a liftoff process (FIG. 14b). Alternatively, bottom capacitor plate 142 and/or resistor 143 can be formed by subtraction patterning using ion milling. A suitable material for forming plate 142 and resistor 143 is tantalum. A dielectric layer 144, such as alumina, is then formed over bottom capacitor plate, 142 using, for example, a liftoff process (FIG. 14c). Alternatively, dielectric layer 144 can be formed as a full film in a well-known manner, and vias can be photo-etched in dielectric layer 144 at locations were a connection through layer 144 is desired. A top capacitor plate 145 is formed on dielectric layer 144 using a liftoff process (FIG. 14d). Alternatively, capacitor plate 145 can be formed by subtraction patterning using ion milling. Tantalum is a suitable material for capacitor plate 145. All circuit elements and coil 140 are then covered with a suitable insulator 148, such as alumina (FIG. 14e). Vias 146 are opened to the coil, the capacitor and the resistor (FIG. 14f). An overpass lead 147 is then plated, completing the electrical connections of the various circuit elements (FIG. 14g).

Figure 15A:
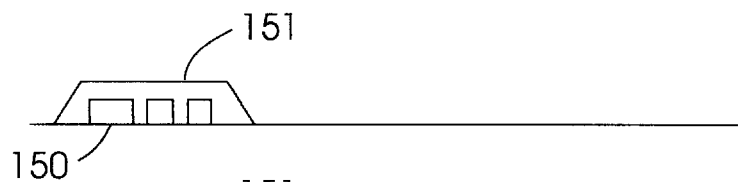
FIGS. 15a–15h show details of an alternative process for forming resistors and capacitors in series or in parallel with a coil according to the present invention.
Figure 15B:
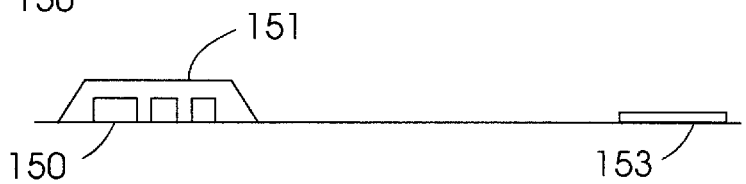
Figure 15C:
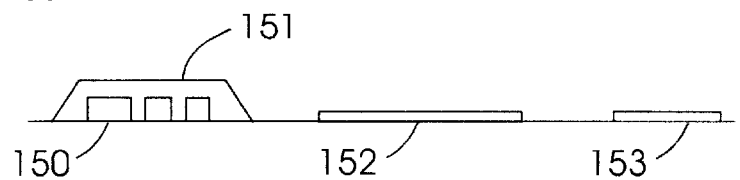
Figure 15D:
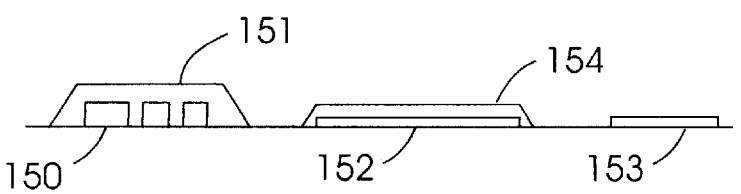
Figure 15E:
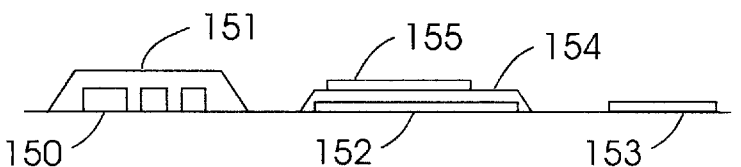
Figure 15F:
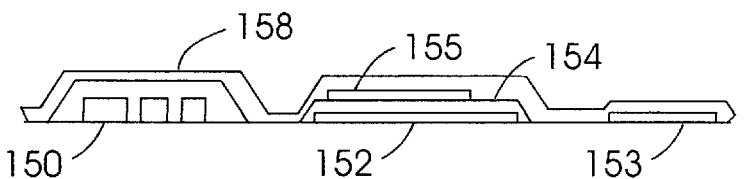
Figure 15G:
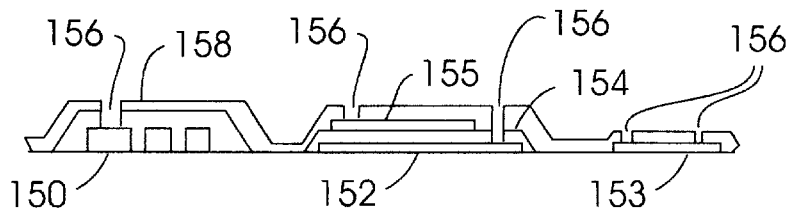
Figure 15H:
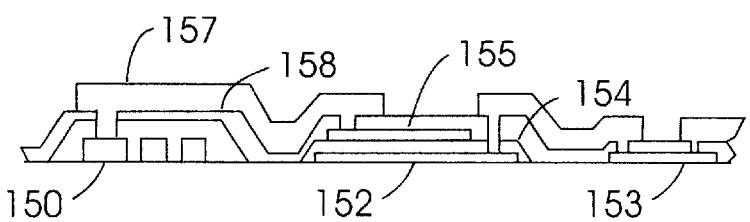

In an alternative embodiment, the resistor material and the capacitor plate material can be different. The details of this process sequence is shown in FIGS. 15a–15h. After coil 150 and coil insulation 151 are formed on a wafer W (FIG. 15a), a resistor 153 is formed using a liftoff process (FIG. 15b). Alternatively, resistor 153 can be formed by subtraction patterning using ion milling. A suitable material for forming resistor 153 is tantalum. A bottom capacitor plate 152 is then formed using a liftoff process (FIG. 15c). Alternatively bottom capacitor plate 152 can be formed by subtraction patterning using ion milling. A suitable material for forming plate 152 is Au, Ta/Au, Cu, Ta/Cu/Ta or Ta/Au/Ta. A dielectric layer 154 is then formed over bottom capacitor plate 152 using, for example, a liftoff process (FIG. 15d). Alternatively, dielectric layer 154 can be formed as a full film in a well-known manner, and vias can be photo-etched in dielectric layer 154 at locations were a connection through layer 154 is desired. A top capacitor plate 155 is formed on dielectric 154 using a liftoff process (FIG. 15e). Alternatively capacitor plate 155 can be formed by subtraction patterning using ion milling. All circuit elements and coil 150 are then covered with a suitable insulator 158, such as alumina (FIG. 15f). Vias 156 are opened to the coil, the capacitor and the resistor (FIG. 15g). An overpass lead 157 is then plated, completing the electrical connections of the various circuit elements (FIG. 15h).

Figure 16:
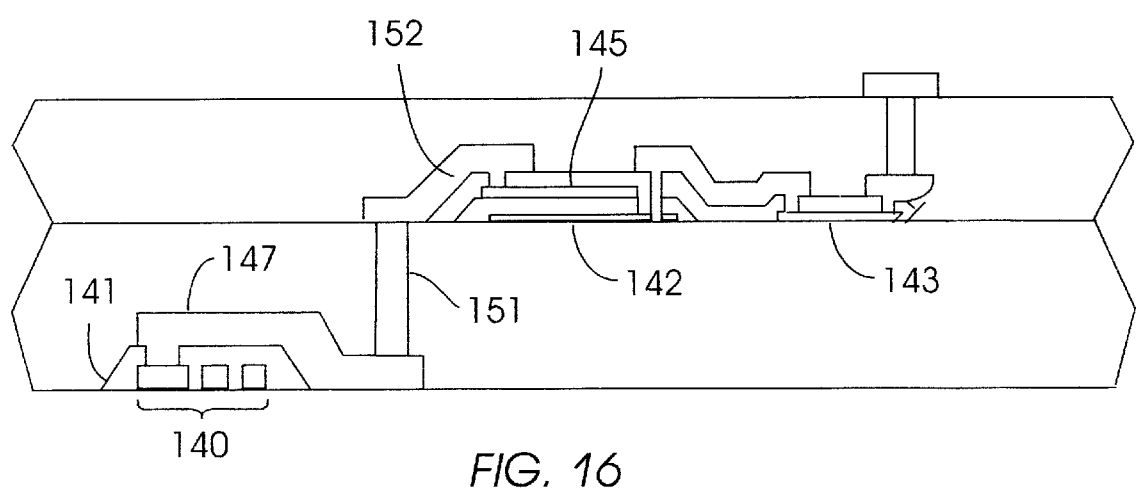
FIG. 16 shows a cross sectional view of electrical circuit elements that are fabricated in a plane above a coil structure according to the present invention.

It is also possible to fabricate electrical circuit elements in a plane above the coil structure. In such an alternative embodiment of the present invention, the wafer surface is planarized after the head, including P2, is completed. Afterward, the capacitors and resistors are formed as in the process sequence shown in FIGS. 14a–14g, but with connection to the coil being made by way of a copper stud structure 151 and an interconnect lead 152. This device resulting from such a sequence is shown in FIG. 16.

In addition to resistors and capacitors, inductors can also be fabricated during the processing of the overpass leads and the interconnect leads by forming coil structures along with the lead structures. Alternatively, the electrical elements of the present invention can be formed prior to the initial head structure directly on the undercoat.

While the present invention has been described in connection with the illustrated embodiments, it will be appreciated and understood that modifications may be made without departing from the true spirit and scope of the invention.

What is claimed is:

1. A method for forming a termination for a magnetic write head, the method comprising steps of:

forming a magnetic write coil on a wafer, the write coil having an inner turn and an outer turn;

forming a bottom capacitor plate for a capacitor on the wafer;

forming a resistor on the wafer, the resistor having a first terminal and a second terminal;

forming a dielectric layer over the bottom capacitor plate for the capacitor;

forming a top capacitor plate on the dielectric layer;

forming an overpass lead between the inner turn of the write coil and one of the bottom capacitor plate and the top capacitor plate;

connecting the first terminal of the resistor to the capacitor plate that is not connected to the inner turn of the write coil, connecting the second terminal of the resistor to the outer turn of the write coil, an impedance formed by the write coil, the capacitor and the resistor substantially equaling a characteristic impedance $Z_0$ of an interconnect circuit that will be connected to the write coil.

2. The method according to claim 1, further comprising a step of connecting a circuit formed by the write coil, the capacitor and the resistor to the interconnect circuit.

3. The method according to claim 1, wherein the capacitor and the resistor form a load termination network that is connected in parallel across the write coil.

4. The method according to claim 3, wherein the write coil has an inductance $L_h$ and a resistance $R_h$, wherein the load termination network includes a first resistance R, a second resistance $R_{ex}$ and a capacitance C, and wherein the characteristic impedance $Z_0$ of the interconnect circuit, the inductance $L_h$ and the resistance $R_h$ of the coil, and the first resistance R, the second resistance $R_{ex}$ and the capacitance C of the load terminated network are related by $$Z_0 = R = R_{ex} + R_h = \sqrt{L_h/C}.$$

5. The method according to claim 3, wherein the write coil has an inductance $L_h$, a resistance $R_h$, and a parasitic capacitance $C_{par}$, wherein the load termination network includes a first resistance R, a second resistance $R_{ex}$ and a capacitance C, and wherein the characteristic impedance $Z_0$ of the interconnect circuit, the inductance $L_h$, the resistance $R_h$ and the parasitic capacitance $C_{par}$ of the coil, and the first resistance R, the second resistance $R_{ex}$ and the capacitance C of the load terminated network are related by $$Z_0 = R = R_{ex} + R_h = \sqrt{\frac{L_h - C_{par}R_h^2}{C}}.$$

6. The method according to claim 1, wherein the bottom capacitor plate and the resistor are formed from different materials.

7. The method according to claim 6, wherein the bottom capacitor plate is formed from one of gold, tantalum/gold, copper, tantalum/copper/tantalum and tantalum/gold/tantalum, and the resistor is formed from tantalum.

8. A magnetic head, comprising:

a substrate;

a write coil formed on the substrate, the write coil having an inner turn and an outer turn; and a load termination network for the coil formed on the substrate and having a first terminal and a second terminal, the first terminal being connected to the inner turn of the write coil and the second terminal being connected to the outer turn of the write coil, the load termination circuit including at least one of a capacitor and a resistor, an impedance formed by the termination circuit substantially equaling a characteristic impedance $Z_0$ of an interconnect circuit that will be connected to the write coil.

9. The magnetic head according to claim 8, wherein the load termination network includes a capacitor and a resistor forming a load termination network that is connected in parallel across the write coil.

10. The magnetic head according to claim 9, wherein the write coil has an inductance $L_h$ and a resistance $R_h$, wherein the load termination network includes a first resistance R, a second resistance $R_{ex}$ and a capacitance C, and wherein the characteristic impedance $Z_0$ of the interconnect circuit, the inductance $L_h$ and the resistance $R_h$ of the coil, and the first resistance R, the second resistance $R_{ex}$ and the capacitance C of the load terminated network are related by $$Z_0 = R' = R_{ex} + R_h = \sqrt{L_h/C}.$$

11. The magnetic recording head according to claim 9, wherein the write coil has an inductance $L_h$, a resistance $R_h$, and a parasitic capacitance $C_{par}$, wherein the load termination network includes a first resistance R, a second resistance $R_{ex}$ and a capacitance C, and wherein the characteristic impedance $Z_0$ of the interconnect circuit, the inductance $L_h$, the resistance $R_h$ and the parasitic capacitance $C_{par}$ of the coil, and the first resistance R, the second resistance $R_{ex}$ and the capacitance C of the load terminated network are related by $$Z_0 = R = R_{ex} + R_h = \sqrt{\frac{L_h - C_{par}R_h^2}{C}}.$$

12. A disk drive, comprising:

a write driver output stage having an output;

an interconnect circuit having an input, all output and a characteristic impedance $Z_0$, the input of the interconnect circuit being coupled !to the write signal output of the write driver output stage; and a magnetic head having an input coupled to the output of the interconnect circuit, the magnetic bead including a substrate, a write coil formed on the substrate, the write coil having an inner turn and an outer turn, and a load termination network for the coil formed on the substrate and having a first terminal and a second terminal, the first terminal being connected to the inner turn of the write coil and the second terminal being connected to the outer turn of the write coil, the load termination circuit including at least one of a capacitor and a resistor.

13. The disk drive according to claim 12, wherein the load termination network includes a capacitor and a resistor forming a load termination network that is connected in parallel across the write coil, an impedance formed by the write coil, the capacitor and the resistor substantially equaling a characteristic impedance $Z_0$ of the interconnect circuit.

14. The disk drive according to claim 12, wherein the write coil has an inductance $L_h$ and a resistance $R_h$, wherein the load termination network includes a first resistance R, a second resistance $R_{ex}$ and a capacitance C, and wherein the characteristic impedance $Z_0$ of the interconnect circuit, the inductance $L_h$ and the resistance $R_h$ of the coil, and the first resistance R, the second resistance $R_{ex}$ and the capacitance C of the load terminated network are related by $$Z_0 = R = R_{ex} + R_h = \sqrt{L_h/C}.$$

15. The disk drive according to claim 13, wherein the write coil has an inductance $L_h$, a resistance $R_h$, and a parasitic capacitance $C_{par}$, wherein the load termination network includes a first resistance R, a second resistance $R_{ex}$ and a capacitance C, and wherein the characteristic impedance $Z_0$ of the interconnect circuit, the inductance $L_h$, the resistance $R_h$ and the parasitic capacitance $C_{par}$ of the coil, and the first resistance R, the second resistance $R_{ex}$ and the capacitance C of the load terminated network are related by $$Z_0 = R = R_{ex} + R_h = \sqrt{\frac{L_h - C_{par}R_h^2}{C}}.$$

* * * * *